L. GEIGER.

Breech-Loading Fire-Arms.

No. 5,727. Reissued Jan. 13, 1874.

Witnesses.

Harry King.
H. B. Munn

Inventor:

Leonard Geiger
by Dodge & Son
Attys.

AM. PHOTO-LITHOGRAPHIC Co. N.Y. (OSBORNE'S PROCESS.)

UNITED STATES PATENT OFFICE.

LEONARD GEIGER, OF HUDSON, NEW YORK, ASSIGNOR TO CHARLES C. ALGER, OF NEW LONDON, CONNECTICUT.

IMPROVEMENT IN BREECH-LOADING FIRE-ARMS.

Specification forming part of Letters Patent No. 37,501, dated January 27, 1863; reissue No. 2,231, dated April 17, 1866; reissue No. 5,727, dated January 13, 1874; application filed February 12, 1873.

*To all whom it may concern:*

Be it known that I, LEONARD GEIGER, of Hudson, Columbia county, State of New York, have invented certain new and useful Improvements in Breech-Loading Fire-Arms; and I do hereby declare that the following is a full, clear, and exact description of the same, reference being had to the accompanying drawings, forming a part of this description, in which—

Figure 1:
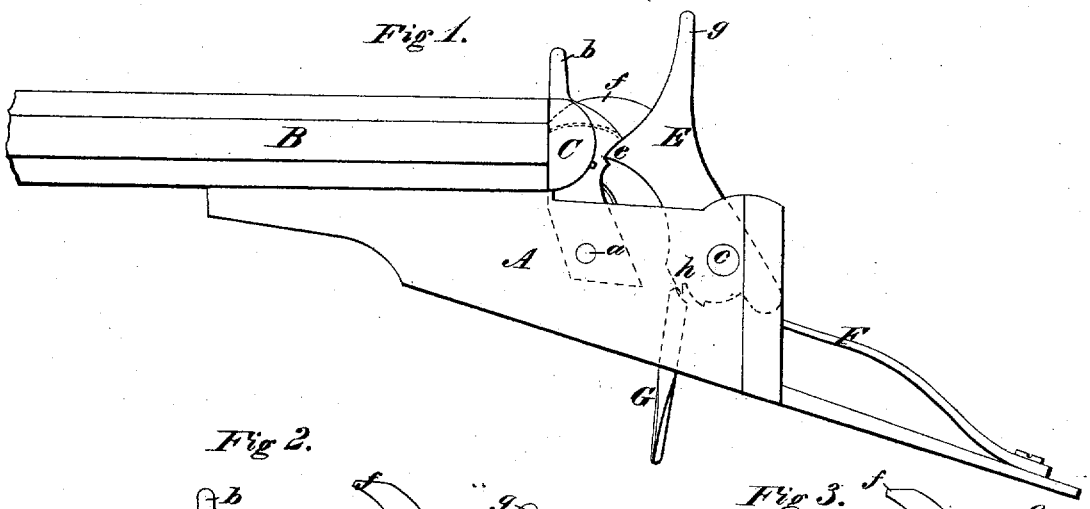
Figure 2:
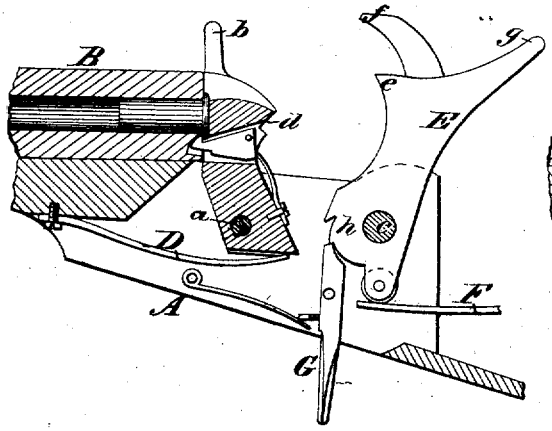
Figure 3:
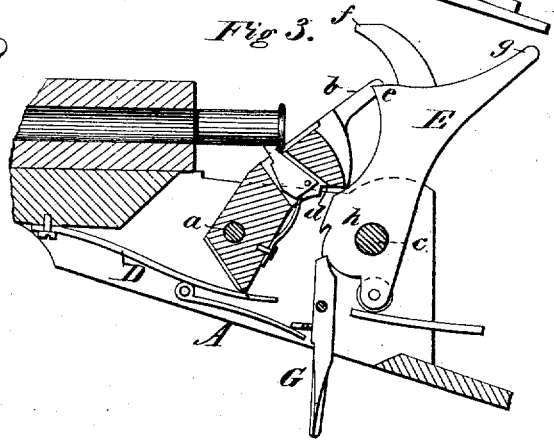
Figure 4:
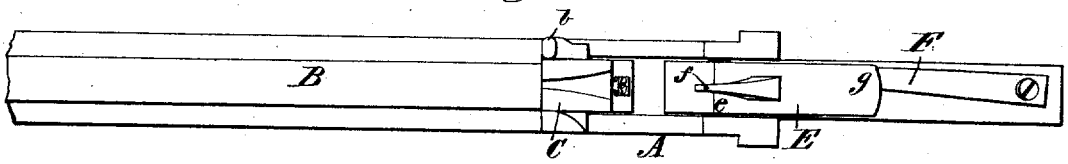

Figure 1 is a side elevation of a part of a barrel and breech-frame of a fire-arm with my improvements applied thereto. Fig. 2 is a longitudinal section through the same in the axis of the barrel; and Fig. 3 is a plan of the same.

My improvement consists in certain new combinations of a barrel bored through from end to end, with a swinging breech-piece and a swinging shoulder and other devices, as hereinafter specified, these improvements conducing to the strength and facility of manipulation of the arm, and cheapness of construction.

In the accompanying drawings, which exhibit my invention in the form preferred by me, A is the breech-frame, which connects the barrel B with the stock. C is the swinging breech-piece or breech-piece working upon a pin, *a*, in a mortise or slot in the frame A, and furnished with an ear or thumb-piece, *b*, by means of which the breech may be opened or closed. D is a spring, acting upon the breech-piece for the purpose of keeping it closed when the hammer is drawn back. The same spring serves also to hold the breech open during the operation of loading. In Fig. 2, the black outlines show the breech and spring in the closed, and the red outlines in the open, position of the former. E is a piece of metal in which are combined a nose, *f*, the point of which strikes and explodes the cartridge; a locking-shoulder, *e*, separate and distinct from the nose *f*; a thumb-piece, *g*, and tumbler *h*. These parts, in the construction shown in the drawings, all move together when the arm is fired, and are drawn back by means of the thumb-piece *g*. This piece E is pivoted upon a strong pin, *c*. The breech is so formed at *d* that it may be locked by the shoulder *e*. The piece E is provided with a main spring, F, to throw it toward the breech, and a trigger, G.

By inspection of the drawings, it will be perceived that the swinging breech-piece vibrates in a plane passing through the axis of the barrel, and is moved by an ear projecting above the breech-frame, and above the pin on which the breech-piece swings, instead of by means of a lever or other device projecting below the barrel, as is usually the case; and, by this arrangement, the construction of the gun is cheapened, the slot or opening in the lower side of the breech-frame is dispensed with, and the manipulation of the arm is more easy, as the opening of the breech is effected by a motion similar to the ordinary cocking of a gun. It will also be perceived that the breech-piece is not chambered to receive a cartridge within it, but is a block or gate for closing the butt of the barrel after the cartridge is inserted into that butt. The breech-piece may, therefore, be called a solid breech-piece, to distinguish it from the chambered breech-pieces sometimes used in fire-arms. By inspection of the drawings, it will also be seen that the swinging breech-piece is locked to resist the explosion of the charge, by a swinging shoulder detached from the breech-piece, and thrown into place prior to the firing of the charge. It will likewise be noticed that both the hammer and the swinging shoulder are independent of the breech-piece in its motions—or, in other words, that the arm may be cocked or half-cocked, or the shoulder withdrawn from or replaced in the locking position, without opening the breech-piece, and that the breech-piece is held shut while the shoulder is out of contact with it by a spring; and also, that the combination is such that the shoulder resists the force of the explosion; and the following results follow from these peculiarities in construction: First, all devices for locking the breech-piece and resisting the strain of the explosion, except the shoulder swinging on a pivot, are dispensed with; second, the gun may be carried full or half-cocked, when loaded, without danger of the falling out of the cartridge; third, that the locking of the breech-piece is effected prior to the explosion of the charge, and that the gun cannot be fired unless the breech is closed and the breech-piece locked; fourth, that the breech-piece is unlocked, so that it may be opened by pulling back the shoulder by means of a thumb-piece after it has been thrown into the locking position by the main spring.

In order to load the gun, it is first cocked or half-cocked, which will withdraw the shoulder, and unlock the breech-piece. The breech-piece is then pulled back by taking hold of the ear, as in cocking a common gun, and will be held open by the spring in the precise construction shown in the drawings. The cartridge is then to be shoved in, ball first, and the breech-piece closed, being held closed by the spring, so that the cartridge will not be displaced, even if the hammer be kept at full or half-cock. The gun may be fired in the usual way, and the shoulder will be carried under the breech-piece so as to lock the breech, the strain of the explosion being sustained by the swinging shoulder, the hammer being unable to explode the charge until the shoulder locks the breech-piece.

Any proper kinds of cartridges may be employed, and the firing may be effected by a percussion-cap or other kind of priming; but I prefer to use cartridges with metal cases, which also contain the priming.

Fig. 2 represents, attached to the breech-piece, a contrivance for withdrawing from the barrel the cases or shells of exploded cartridges.

In constructing the gun, I prefer to make the locking-shoulder and hammer in one piece, as being simpler and cheaper. The various peculiarities of construction that are important in the combinations hereafter specified are these: That the shoulder does not consist of the nose of the hammer; that it is introduced below the nose of the hammer; that it effects the locking of the breech-piece by passing under or behind the block, instead of cutting into it; that it moves either with or in advance of the hammer, so that the hammer cannot strike and explode the cartridge until the locking-shoulder is in position to secure the breech; and also that the swinging shoulder locks the swinging breech, so that the force, strain, or shock of the explosion is transferred to and resisted by the swinging shoulder.

Neither do I claim an ear, or handle, or thumb-piece made in one piece with the swinging breech-piece, although I prefer that construction, the peculiarity of construction that is important being not in the mode of connection, but in the position of the ear and the plane of vibration of the breech-piece, as before described, so that the breech-piece may be opened by a manipulation similar to cocking an ordinary gun-lock.

I do not claim a swinging or pivoted breech-piece by itself, nor a swinging breech-piece in combination with an independent hammer, as there are many well-known forms of such contrivances; and I do not claim a swinging breech-piece in combination with a hammer and a locking-shoulder, which are so connected in operation with the breech-piece by mechanical devices that the breech-piece moves when the hammer and the shoulder moves, and vice versa.

Neither do I claim the combination, broadly, of a swinging locking-shoulder independent of the breech-piece, pivoted in rear of said breech-piece, for the purpose of locking or unlocking said breech-piece, with the several elements hereinafter mentioned, as such a combination is shown in the French patent granted to Flobert in November, 1855. In the case of Flobert the nose of the hammer served the double purpose of exploding the cartridge and locking the breech-piece. The latter operation was performed by the nose of the hammer passing through the breech-block; and, if the nose of the hammer were made large enough to afford a sufficient locking-shoulder, it would cut into and detract from the strength of the breech-block; and, again, the shoulder in that case is necessarily too high up to afford a sufficient mode of resisting the recoil of the charge. These objections are obviated in my invention by the introduction of a locking-shoulder other than the nose of the hammer, and below it, which effects the process of locking by passing below or behind the breech-block, instead of passing through or cutting into it, thus giving a sufficient bearing-surface on the locking-shoulder, combined with a solid and strong breech-block; but I do claim as my invention in fire-arms—

1. These elements in combination, namely: A barrel open at the breech, a solid breech-piece swinging in the plane of the barrel, a swinging locking-shoulder other than the nose of the hammer, independent of the breech-piece, located below the nose or face of the hammer, and pivoted in rear of said breech-piece, for the purpose of locking and unlocking said breech-piece, so constructed as that the operation of locking is effected by the said locking-shoulder passing behind or below the breech-block; and a thumb-piece located above the center of motion of said locking-shoulder, for the purpose of operating the same, substantially as described.

2. These elements in combination, namely: A barrel open at the breech; a solid breech-piece swinging in the plane of the barrel; a spring for forcing the locking-shoulder under the breech-piece; a swinging locking-shoulder other than the nose of the hammer, independent of the breech-piece, located below the nose or face of the hammer, and pivoted in rear of said breech-piece, for the purpose of locking or unlocking said breech-piece, so constructed as that the operation of locking is effected by the said locking-shoulder passing behind or below the breech-block; and a thumb-piece located above the center of motion of said locking-shoulder, for the purpose of operating the same, substantially as described.

3. The combination, in a breech-loading gun, of a barrel open at its rear end, with a breech-block provided with a thumb-piece and a recoil or bearing surface on its rear or under side, other than the passage through which the hammer transmits its blow for firing the gun, and a swinging locking-shoulder other than the nose of the hammer, and independent of the breech-block, said breech-block and hammer being pivoted in rear of the barrel, substantially as described.

4. In combination with a barrel open at the breech, a solid breech-piece swinging in the plane of the barrel; a spring for the purpose of forcing the locking-shoulder under the breech-piece; and a swinging locking-shoulder other than the nose of the hammer, independent of the breech-piece, located below the nose or face of the hammer, and pivoted in rear of said breech-piece, so constructed as that the operation of locking is effected by the said locking-shoulder passing behind or below the breech-block, substantially as described.

5. In combination with a barrel open at the breech, a solid breech-piece swinging in the plane of the barrel; a spring for the purpose of holding the breech-piece closed; an ear or thumb-piece, located substantially as described, by which the breech-piece may be operated from above its center of motion; a swinging locking-shoulder, other than the nose of the hammer, independent of the breech-piece, located below the nose or face of the hammer, and pivoted in rear of said breech-piece, for the purpose of locking and unlocking said breech-piece, so constructed as that the operation of locking is effected by said locking-shoulder passing behind or under the breech-block; a thumb-piece located above the center of motion of said locking-shoulder, for the purpose of operating the same, and a spring for the purpose of forcing the locking-shoulder under the breech-piece, substantially as described.

CHARLES C. ALGER,
*Assignee of L. Geiger.*

Witnesses:
GEO. PRATT,
HENRIETTE E. BULL.